US009080383B2

(12) United States Patent
Meillet

(10) Patent No.: US 9,080,383 B2
(45) Date of Patent: Jul. 14, 2015

(54) CLIMB ASSIST SYSTEM

(75) Inventor: Vincent G. Meillet, Cannes la Bocca (FR)

(73) Assignee: D B Industries, LLC, Red Wing, MN (US)

( * ) Notice: Subject to any disclaimer, the term of this patent is extended or adjusted under 35 U.S.C. 154(b) by 530 days.

(21) Appl. No.: 12/694,079

(22) Filed: Jan. 26, 2010

(65) Prior Publication Data

US 2010/0219015 A1 Sep. 2, 2010

Related U.S. Application Data

(60) Provisional application No. 61/196,716, filed on Mar. 2, 2009, provisional application No. 61/167,459, filed on Apr. 7, 2009.

(51) Int. Cl.
E06C 7/18 (2006.01)
F16D 63/00 (2006.01)
F16D 127/00 (2012.01)

(52) U.S. Cl.
CPC .............. *E06C 7/186* (2013.01); *F16D 63/006* (2013.01); *F16D 2127/002* (2013.01)

(58) Field of Classification Search
CPC ........................................................ E06C 7/187
USPC .............................................. 182/8, 234, 239
See application file for complete search history.

(56) References Cited

U.S. PATENT DOCUMENTS

| 55,344 | A | * | 6/1866 | Nell .............................. 403/104 |
| 108,761 | A | | 11/1870 | Clover |
| 1,672,959 | A | | 6/1928 | Spillman |
| 2,546,202 | A | * | 3/1951 | Trouin ........................ 242/381.6 |
| 3,151,857 | A | | 10/1964 | Falkenberg |
| 3,436,979 | A | | 4/1969 | Molitor |
| 3,477,670 | A | | 11/1969 | Sloyan |
| 3,826,335 | A | * | 7/1974 | Allen .............................. 182/10 |
| 3,944,185 | A | * | 3/1976 | Evans ........................... 254/378 |
| 4,252,214 | A | | 2/1981 | Miller |
| 4,258,832 | A | * | 3/1981 | Thorp .......................... 188/184 |

(Continued)

FOREIGN PATENT DOCUMENTS

DE 38 17 435 A1 11/1989
DE 20 2007 012 803 U1 3/2009

(Continued)

OTHER PUBLICATIONS

Non-final Office Action for U.S. Appl. No. 12/694,086 mailed Mar. 12, 2012.
Avanti Climb Assistance—A Safe Investment. Avanti Wind Systems, Products and Services [online] [retrieved on Apr. 26, 2010] retrieved from <http://www.avanti-online.com/_binary?id=12610>.

(Continued)

*Primary Examiner* — Katherine Mitchell
*Assistant Examiner* — Candace L Bradford
(74) *Attorney, Agent, or Firm* — IPLM Group, P.A.

(57) ABSTRACT

A motorized climb assist assembly is provided. The motorized climb assist assembly includes a looped belt, an attaching member, a motor assembly and a fall arrest system. The attaching member is coupled to the looped belt. A safety harness is in turn coupled to attaching member. The motor assembly includes a motor and a drive sheave. The motor has a drive shaft. The drive sheave is coupled to the drive shaft. In addition, the drive sheave is in contact with the looped belt. The fall arrest system is integrated with the drive sheave and is configured to limit the looped belt movement as the result of a fall event.

25 Claims, 14 Drawing Sheets

(56) References Cited

U.S. PATENT DOCUMENTS

| | | | | |
|---|---|---|---|---|
| 4,538,703 | A | * | 9/1985 | Ellis et al. ............... 182/5 |
| 4,550,804 | A | | 11/1985 | Bummer |
| 4,611,688 | A | * | 9/1986 | Sekhar ............... 182/237 |
| 4,997,064 | A | * | 3/1991 | Motte et al. ............... 182/231 |
| 5,186,289 | A | * | 2/1993 | Wolner et al. ............... 188/180 |
| 5,829,203 | A | | 11/1998 | Ealer, Sr. |
| 7,798,288 | B2 | * | 9/2010 | Blasek ............... 182/42 |
| 7,987,945 | B2 | * | 8/2011 | Petersen ............... 182/8 |
| 2002/0086752 | A1 | | 7/2002 | Friedrich et al. |
| 2004/0020719 | A1 | * | 2/2004 | Kwak ............... 182/196 |
| 2004/0087400 | A1 | | 5/2004 | Youn |
| 2007/0062759 | A1 | | 3/2007 | Jones et al. |
| 2007/0158137 | A1 | * | 7/2007 | Petersen ............... 182/8 |
| 2007/0215410 | A1 | | 9/2007 | Ecker |
| 2008/0142298 | A1 | * | 6/2008 | Blasek ............... 182/101 |
| 2009/0249712 | A1 | * | 10/2009 | Brickell et al. ............... 52/173.1 |
| 2009/0288913 | A1 | * | 11/2009 | Nielsen ............... 182/8 |
| 2010/0219016 | A1 | * | 9/2010 | Meillet ............... 182/8 |
| 2010/0326768 | A1 | * | 12/2010 | Kerstetter, Jr. ............... 182/5 |

FOREIGN PATENT DOCUMENTS

| | | | | |
|---|---|---|---|---|
| EP | 1 319 796 A1 | | 6/2003 | |
| WO | WO 92/11065 | | 7/1992 | |
| WO | WO 03/071083 A1 | | 8/2003 | |
| WO | WO 2005/088063 A1 | | 9/2005 | |
| WO | WO 2005088063 A1 | * | 9/2005 | ............... E06C 7/18 |
| WO | WO 2005095750 A1 | * | 10/2005 | ............... E06C 7/12 |

OTHER PUBLICATIONS

Avanti Climb Assistance—Type VI, User—s Manual and Installation Instructions. AVANTI Stigefabrik A/S. $2^{nd}$ Edition, Dec. 2006.
Avanti Climb Assistance—Type VI, User's Manual and Installation Instructions. AVANTI Stigefabrik a/S. $3^{nd}$ Edition, Nov. 2007.
DBI Sala, User Instruction Manual LAD-SAF® Detachable Cable Sleeve. DB Industries, Inc. Form 5902112, Rev: E, 2003.
DBI Sala, User Instruction Manual 3511063 (SSB63) Climb Assist/ Fall Arrest System. DB Industries, Inc. Form 5902147, Rev: D, 2004.
Suncor 316 SS Quick Attach Eye Swage Fitting, Suncor Stainless, Inc. [online] [retrieved Apr. 26, 2010]. Retrieved from Jamestown Distributors webpage at <http://www.jamestowndistributors.com/userportal/show_product.do?pid=52127&familyName=Suncor+316+SS+Quick+Attach+Eye+Swage+Fitting>.
Tractelift® Climbing Aid for vertical ladders, Tractel Inc. Griphoist Divison. G729_tractelift_Pro/GB.pm6.
Avanti Climb Assistance—Type VI, User's Manual and Installation Instructions. AVANTI Stigefabrik A/S. $2^{nd}$ Edition, Dec. 2006.
International Partial Search Report for the Application Serial No. PCT/US2010/024905, mailed Jun. 28, 2010.
Written Opinion-Search Report of the Intellectual Property Office of Singapore for Singapore Application No. 201106007-6 mailed Oct. 31, 2012.
Non-Final Office Action, Examiner PTO-892 for U.S. Appl. No. 13/645,142 mailed Jul. 24, 2014.

* cited by examiner

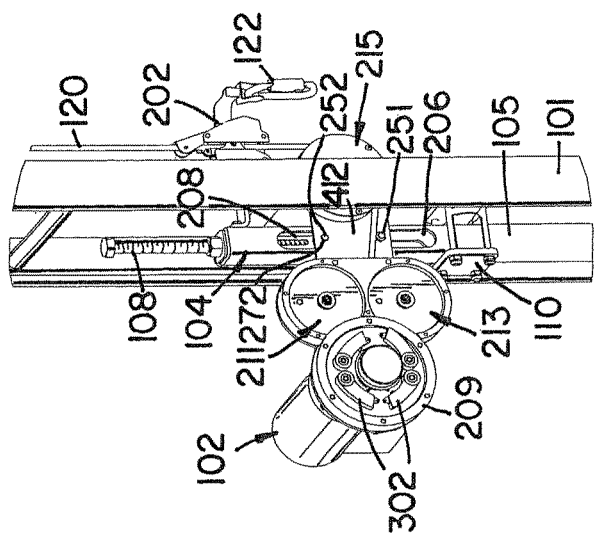
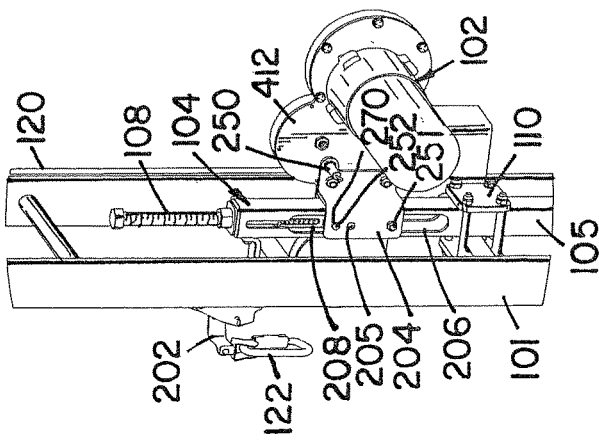

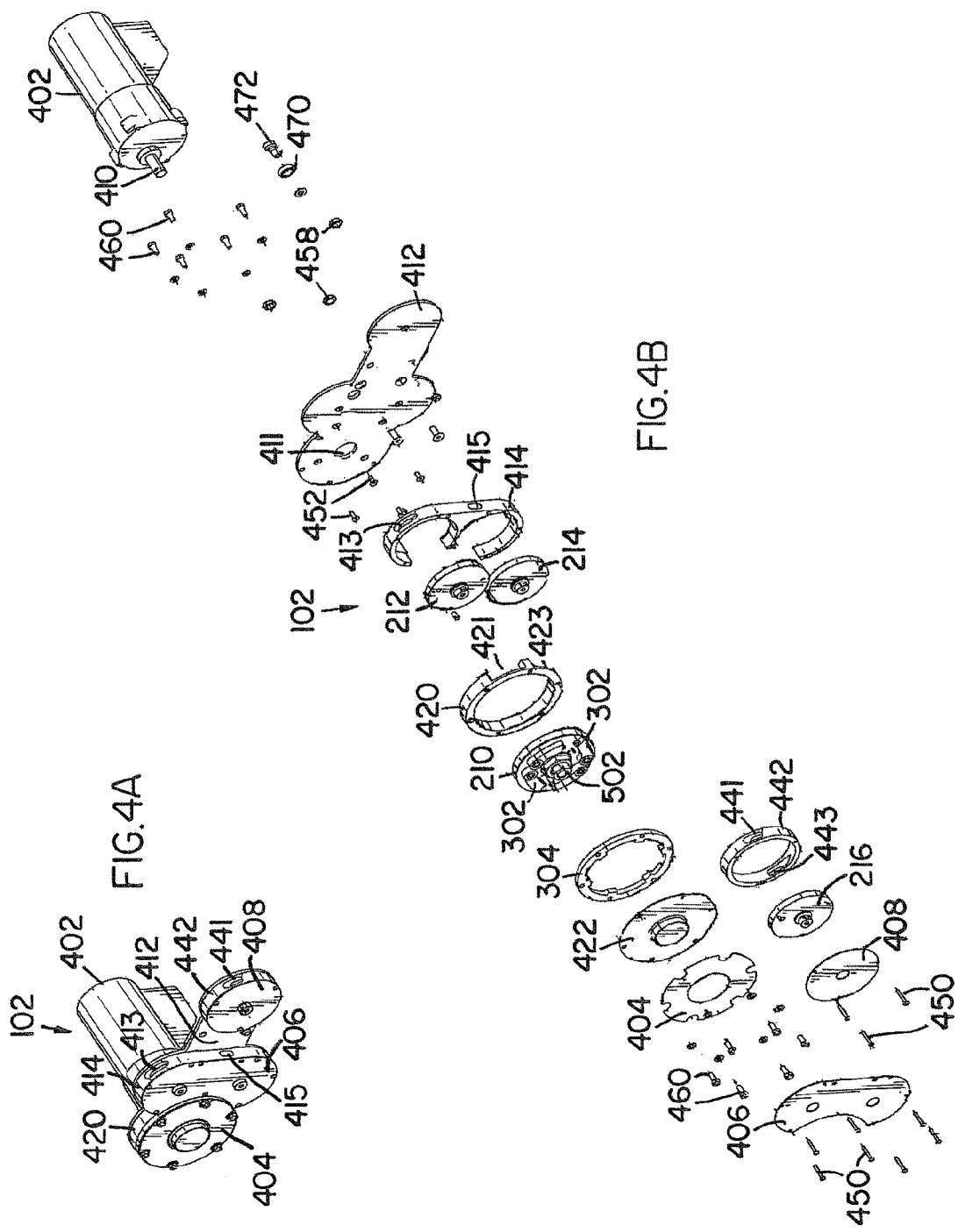

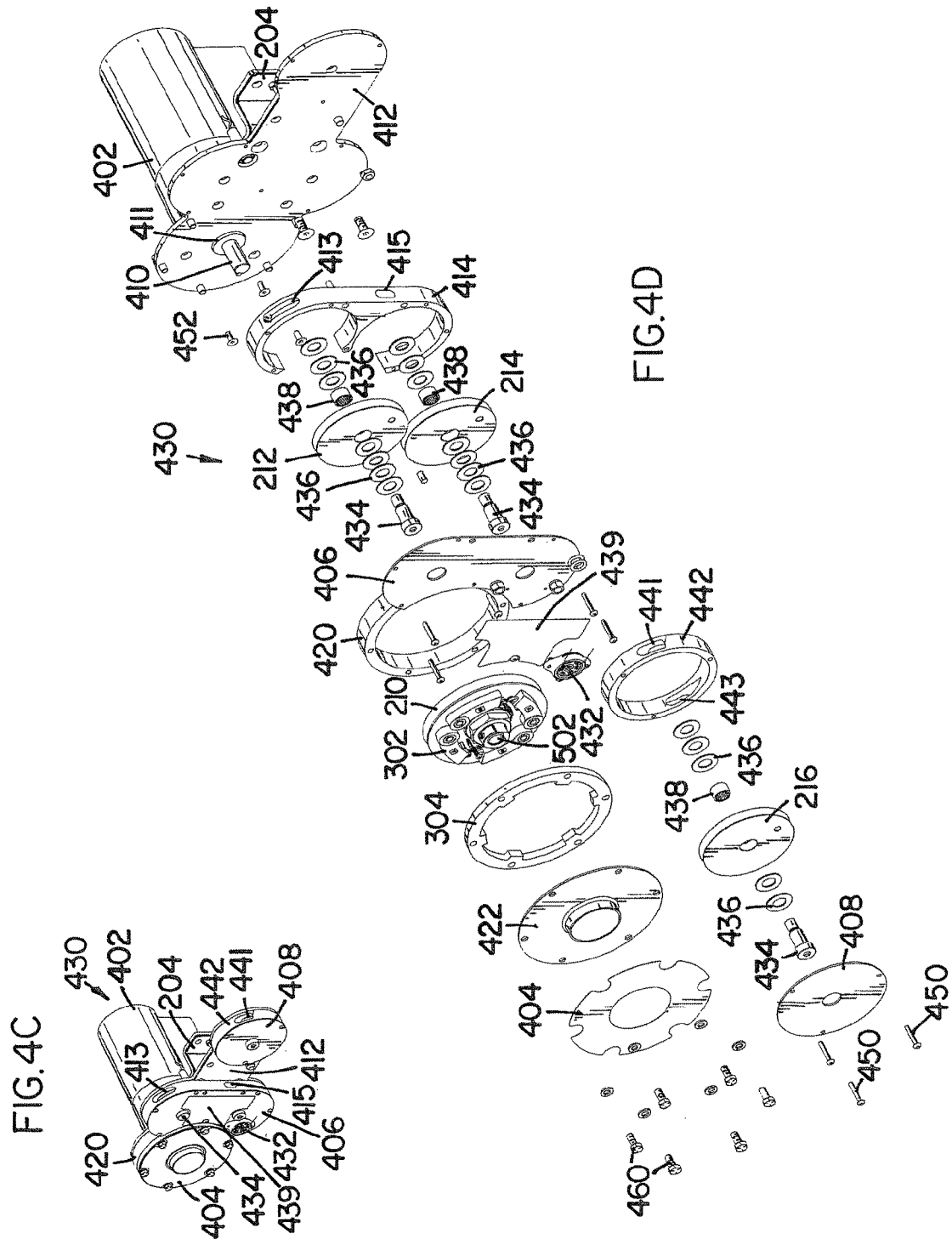

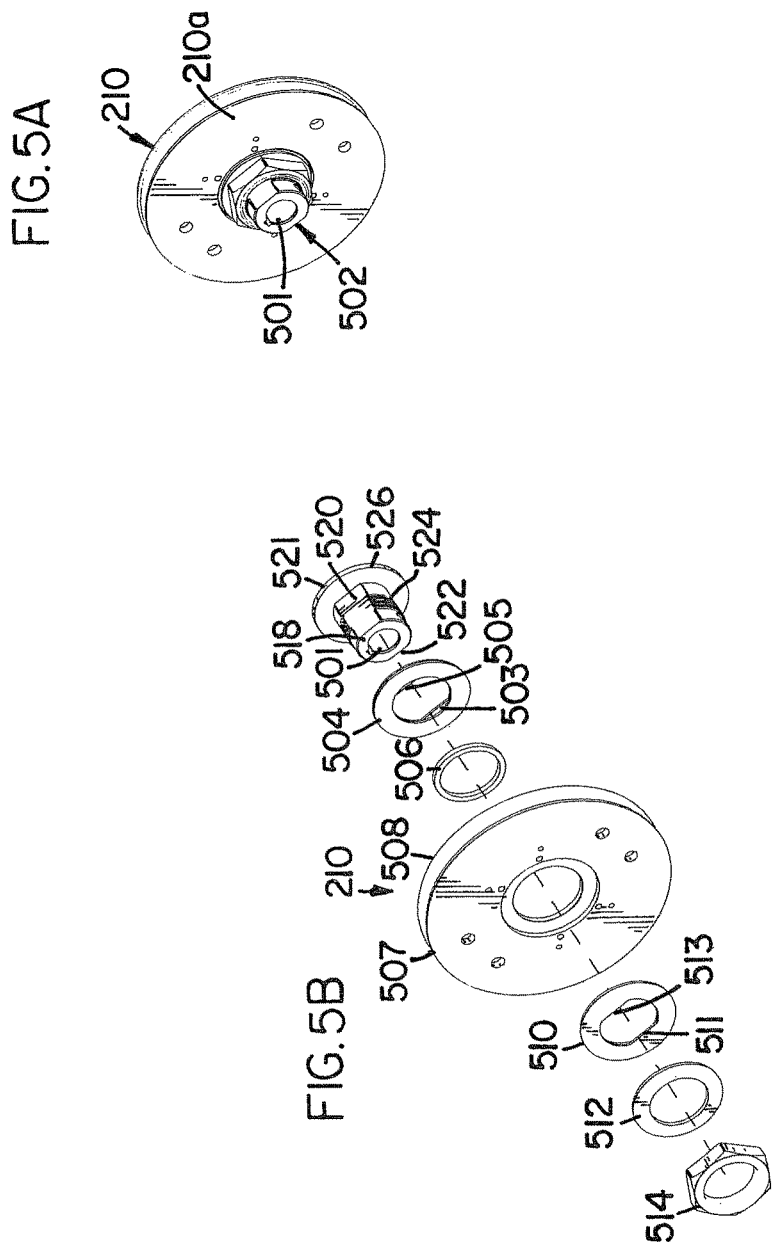

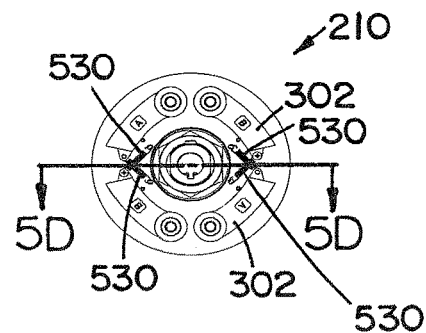
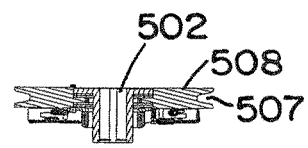
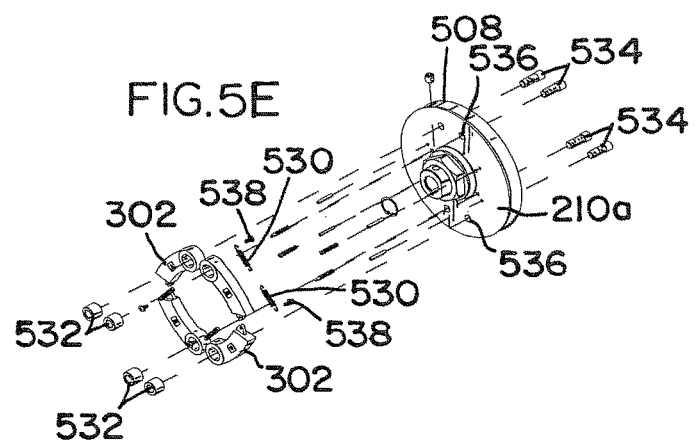

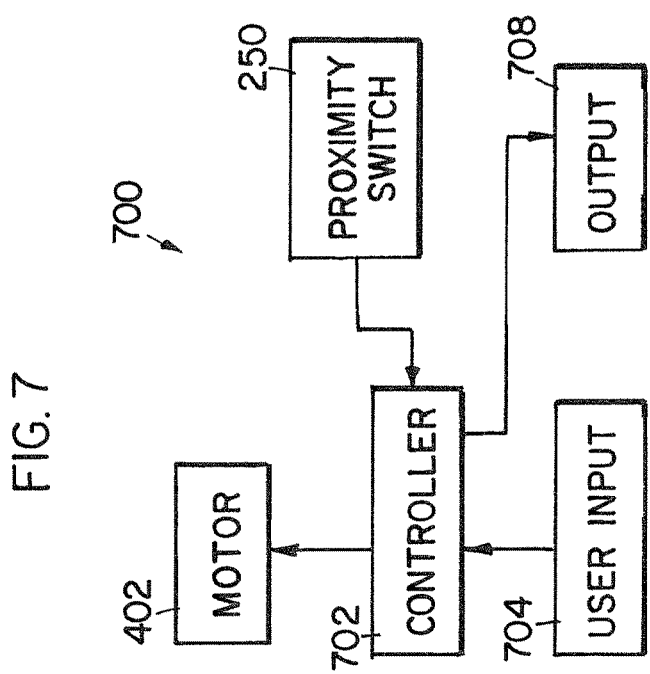

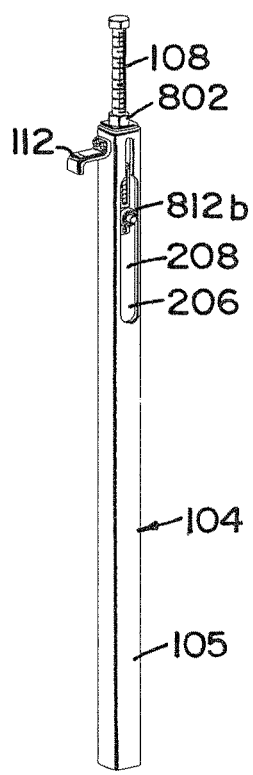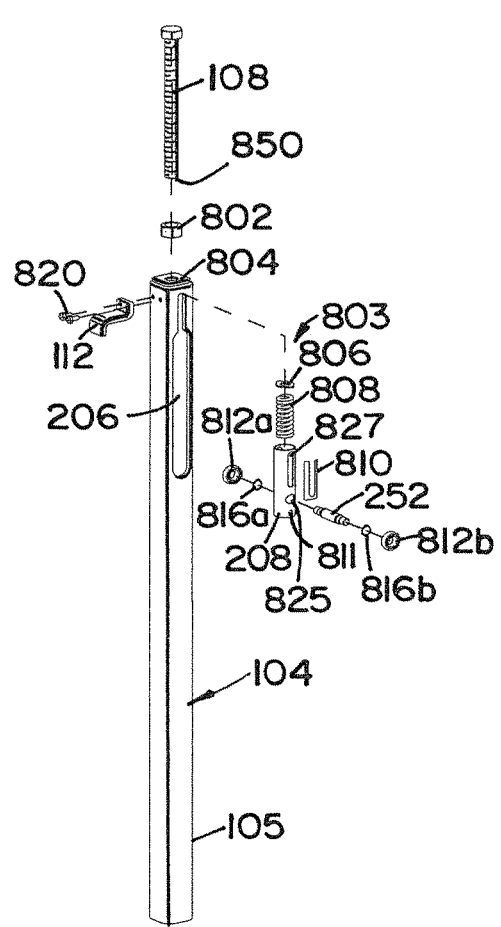

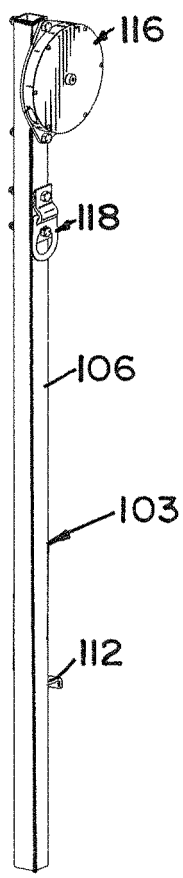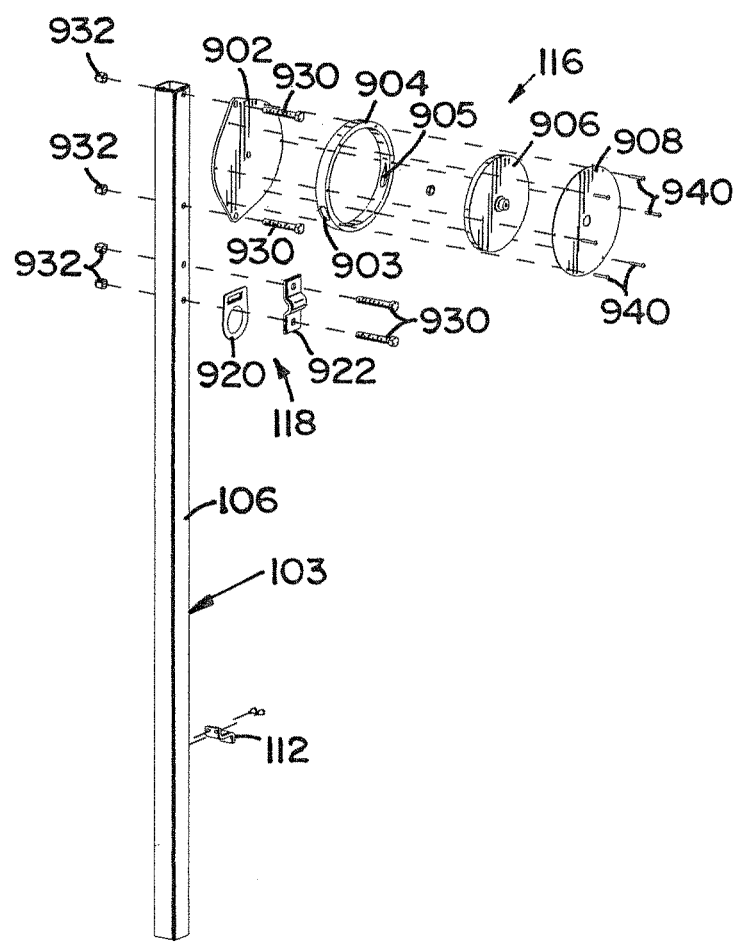

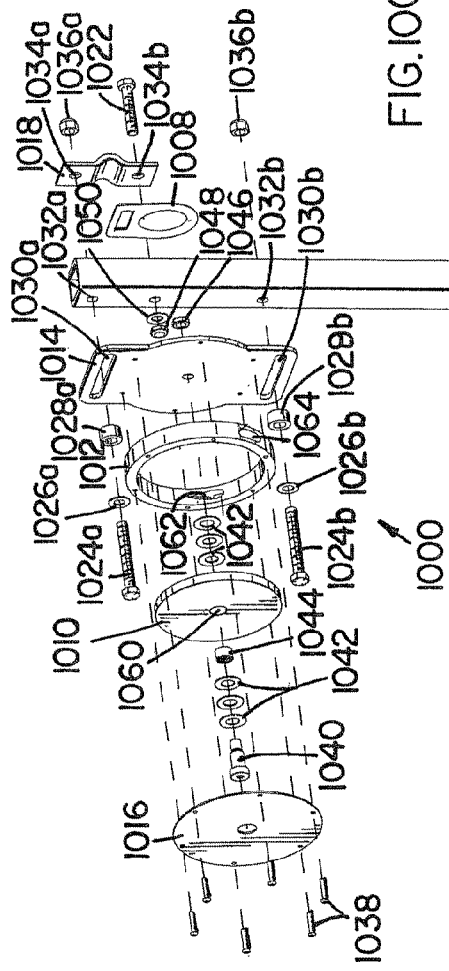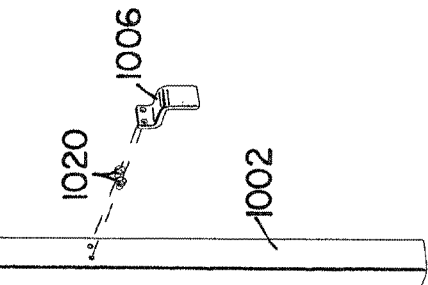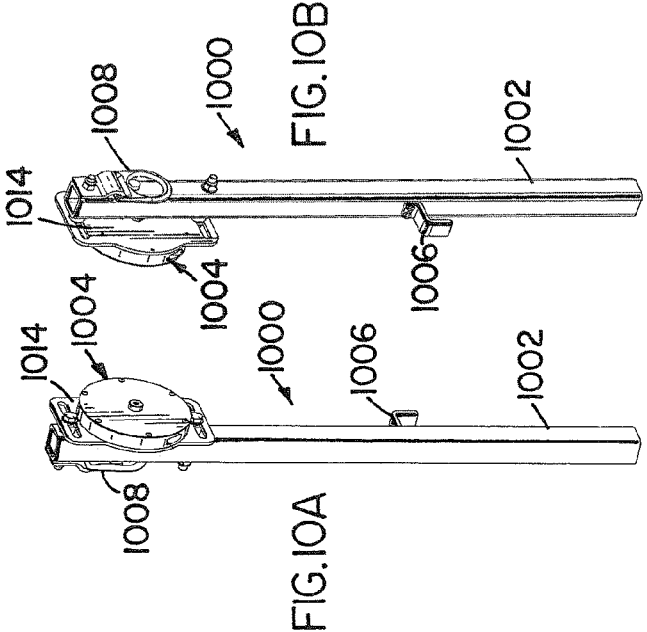

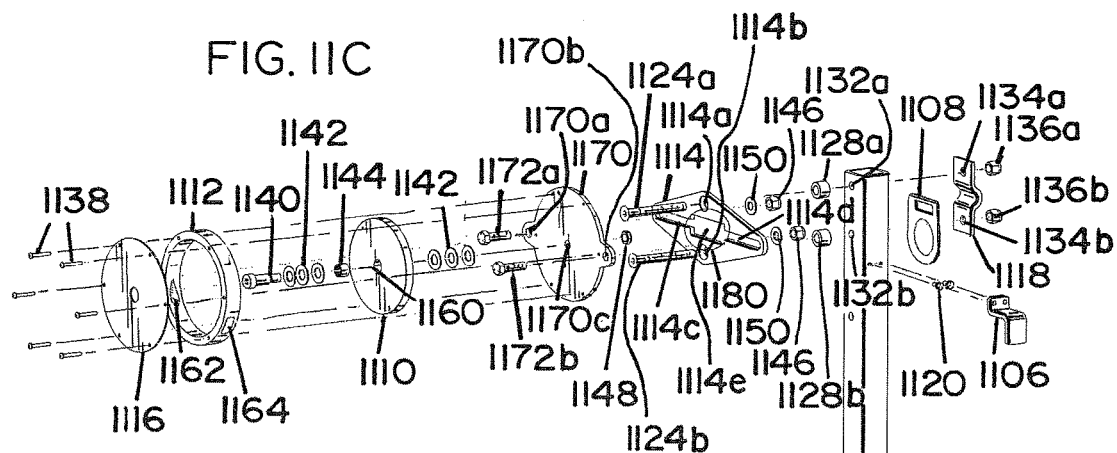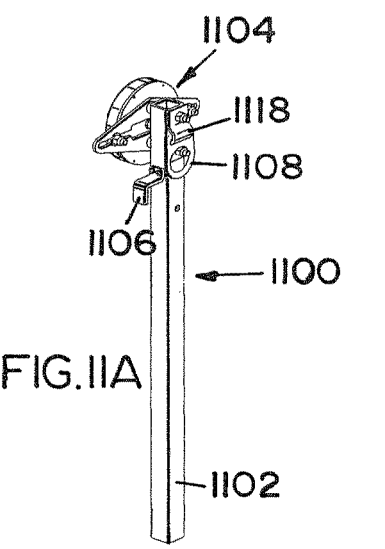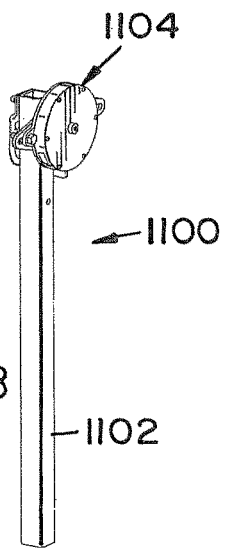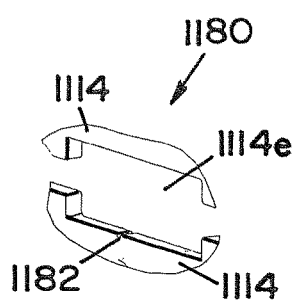

CLIMB ASSIST SYSTEM

CROSS-REFERENCE TO RELATED APPLICATIONS

The present Application claims priority to U.S. Provisional Application Ser. No. 61/196,716, entitled "Climb Assist System," filed on Mar. 2, 2009, and U.S. Provisional Application Ser. No. 61/167,459 entitled "Climb Assist System," filed on Apr. 7, 2009, which are both incorporated in their entirety herein by reference. This Application is further related to U.S. Utility Application Serial No. 12/694086, entitled "Fall Arrest Assembly," filed on even date herewith which is also incorporated in its entirety herein by reference.

BACKGROUND

The ability to service devices that are elevated requires a system for getting a service technician to the device. One common system used to reach elevated locations is a ladder. However, when the distance to reach the device is significant, the use of a ladder is restricted to only those individuals that are physically capable of climbing the distance of the ladder. Safety issues also have to be considered. The more fatigue a worker is experiencing, the more likely an accident could occur such as slipping and falling. Hence, fatigue that comes with climbing great distances should be taken into consideration when implementing a system to reach a device at an elevated location.

For the reasons stated above and for other reasons stated below which will become apparent to those skilled in the art upon reading and understanding the present specification, there is a need in the art for an effective and safe means to assist a worker climb a ladder.

SUMMARY OF INVENTION

The above-mentioned problems of current systems are addressed by embodiments of the present invention and will be understood by reading and studying the following specification. The following summary is made by way of example and not by way of limitation. It is merely provided to aid the reader in understanding some of the aspects of the invention.

In one embodiment a motorized climb assist assembly is provided. The motorized climb assist assembly includes a looped belt, an attaching member, a motor assembly and a fall arrest system. The attaching member is coupled to the looped belt. A safety harness is in turn coupled to attaching member. The motor assembly includes a motor and a drive sheave. The motor has a drive shaft. The drive sheave is coupled to the drive shaft. In addition, the drive sheave is in contact with the looped belt. The fall arrest system is integrated with the drive sheave and is configured to limit the looped belt movement as the result of a fall event.

BRIEF DESCRIPTION OF THE DRAWINGS

The present invention can be more easily understood and further advantages and uses thereof more readily apparent, when considered in view of the detailed description and the following figures in which:

FIG. 2A is a close up rear perspective view of a motor assembly and tension adjusting assembly of one embodiment of the present invention;

FIG. 2B is a close up front perspective view of the motor assembly and the tension adjusting assembly of FIG. 2A;

FIG. 4A is an assembled front prospective view of a motor assembly of one embodiment of the present invention;

FIG. 4B is an exploded front prospective view of the motor assembly of FIG. 4A;

FIG. 4C is an assembled front perspective view of a motor assembly of another embodiment of the present invention;

FIG. 4D is an exploded front perspective view of a motor assembly of another embodiment of the present invention;

FIG. 5A is an assembled front view of a drive sheave of one embodiment of the present invention;

FIG. 5B is an exploded front perspective view of the drive sheave of FIG. 5A;

FIG. 5C is a front view of a drive sheave of one embodiment of the present invention;

FIG. 5D is a cross-sectional side view of the drive sheave of FIG. 5C along line BB;

FIG. 5E is an exploded view front perspective view of the drive sheave of FIG. 5C;

FIG. 7 is block diagram of a control system of one embodiment of the present invention;

FIG. 8A is an assembled front perspective view of a tension adjusting assembly of one embodiment of the present invention;

FIG. 8B is an exploded front perspective view of the tension adjusting assembly of FIG. 8A;

FIG. 9A is an assembled front view of an upper cable guide of one embodiment of the present invention;

FIG. 9B is an exploded front view of the upper cable guide of FIG. 9A;

FIG. 10A is an assembled front view of an upper cable guide of another embodiment of the present invention;

FIG. 10B is an assembled rear view of the upper cable guide of FIG. 10A;

FIG. 10C is an exploded view of the upper cable guide of FIG. 10A:

FIG. 11A is back perspective view of another upper cable guide of an embodiment of the present invention;

FIG. 11B is a front perspective view of the upper cable guide of FIG. 11A;

FIG. 11C is an exploded front perspective view of the upper cable guide of FIG. 11A; and FIG. 11D is a close up view of a section of the upper cable guide of FIG. 11A.

In accordance with common practice, the various described features are not drawn to scale but are drawn to emphasize specific features relevant to the present invention. Reference characters denote like elements throughout Figures and text.

DETAILED DESCRIPTION

In the following detailed description, reference is made to the accompanying drawings, which form a part hereof, and in which is shown by way of illustration specific embodiments in which the inventions may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense, and the scope of the present invention is defined only by the claims and equivalents thereof.

Embodiments of the present invention provide a system that assists a user climb up and down a ladder. In embodiments, a looped cable or similar attaching means such as a looped rope is operatively coupled to the user. The cable provides a select pulling force on the user as the user climbs up or down on the ladder. Hence part of the user's weight is reduced when climbing or descending thereby reducing the effort needed by the user. In some embodiments, the climb assist detects when a user has stopped and in response, ceases the pulling force. In these embodiments, the climb assist is re-established by action of the user, such as pulling on the cable. In further embodiments, a fall arrest system is integrated into the climb assist system.

Figure 1A:
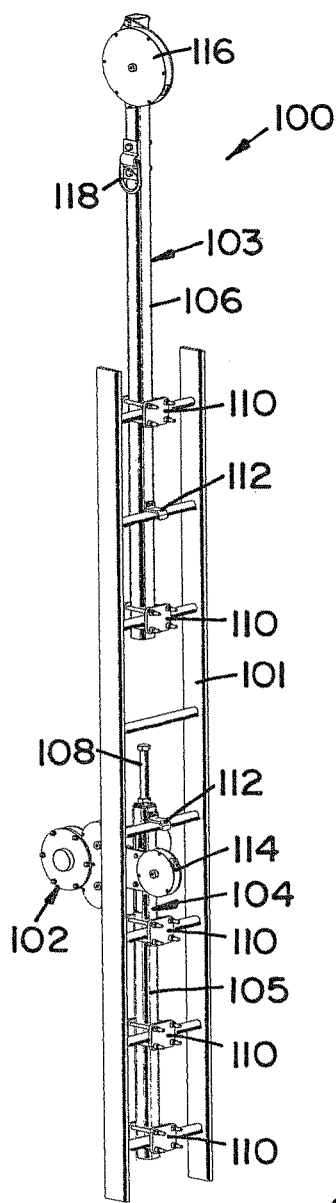
FIG. 1A is a front perspective view of a ladder having a climb assist system of one embodiment of the present invention coupled thereon.
Figure 1B:
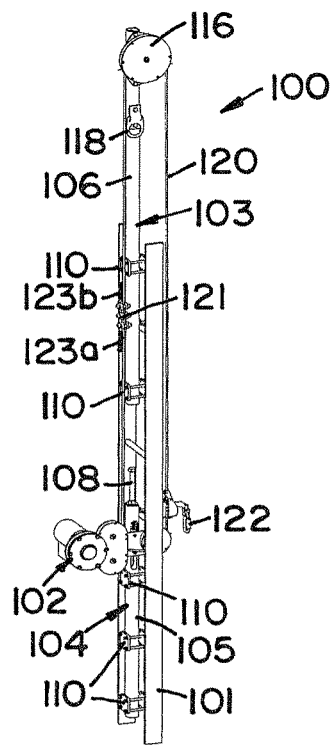
FIG. 1B is rear perspective view of the ladder having the climb assist system of FIG. 1A coupled thereon.

Referring to FIGS. 1A and 1B an embodiment of a climb assist system 100 is illustrated. In particular, FIG. 1A illustrates a front perspective view of a ladder 101 having the climb assist system 100 coupled thereon and FIG. 1B is a rear perspective view of the ladder having the climb assist system 100 coupled thereon. Embodiments of the climb assist system 100 can be coupled to either a front or a back of a ladder 101. The climb assist system 100 includes an upper cable guide 103 (or upper guide 103), a tension adjusting assembly 104, a motor assembly 102 and a looped cable 120. The looped cable 120 or looped rope 120 which is generally an elongated member can be referred to as a looped belt 120. The upper cable guide 103 includes an extension member 106 that is coupled proximate an upper end of ladder 101 via attaching brackets 110. A ladder hook 112 of the extension member 106 is used to position the extension member 106 in place on the ladder 101 while the attaching brackets 110 are engaged. A D-ring 118 is coupled to the extension member 106 of the upper cable guide 103. This D-ring 118 can be used to attach a lanyard or lifeline coupled to a harness donned by a user when the user is working near the extension member 106. Hence, D-ring 118 can be used for fall protection or work positioning. The D-ring 118 can also be used as a connection point for a winch to hoist the extension member up the ladder 101 for initial placement. An upper sheave assembly 116 is coupled proximate an upper end of the extension member 106. The upper sheave assembly 116 routes the looped cable 120 as illustrated in FIG. 1B.

The tension adjusting assembly 104 includes a housing 105 that is attached to the ladder 101 with brackets 110. Similar to the extension member 106, the housing 105 includes a ladder hook 112 used to position the housing 105 on the ladder 101 while attaching brackets 110 are engaged. The motor assembly 102 is coupled to the tension adjusting assembly 104. The motor assembly 102 provides pulling force on the looped cable 120 as is further described below. As FIG. 1B illustrates, the looped cable 120 is routed around the upper sheave assembly 116 and through the motor assembly 102. A climb assist attaching member 122 is coupled to the looped cable 120. A user attaches a safety harness and the like donned by the user to the attaching member 122. In one embodiment the attaching member 122 is a detachable cable sleeve such as LAD-SAF™ detachable cable sleeve parts number 6116540 from DB Industries Inc. In the embodiment of FIG. 1B, the looped cable 120 is a cable with its ends connected together with cable connections 121 to form a loop. In another embodiment, a swageless termination system (not shown) is used to couple the cable ends together. In an example of this system, Quick Attach™ Eye attachments from Suncor Stainless Inc. are used. Other methods of attaching cable ends together to form a loop are contemplated and the present invention is not limited to a specific method. In the embodiment of FIG. 1B, bumpers 123A and 123B are positioned proximate either side of the cable connection. Further in one embodiment, the bumpers 123A and 123B are each made from a cylindrical piece of urethane positioned around the cable 120. The bumpers 123A and 123B stop movement of the cable 120 before the cable connection can hit a vital part of the climb assist system 100. In particular, if bumper 123B comes into contact with the upper sheave assembly 116 or bumper 123A comes in contact with the motor assembly 102 the cable 120 will stop moving. Further discussion relating to the movement and the stopping of the movement of the cable 120 is described below. Hence, bumpers 123A and 123B prevent the connection or other vital parts of the climb assist system 100 from being damaged.

FIGS. 2A and 2B illustrate close up views of the motor assembly 102 and the tension adjusting assembly 104. In particular, FIG. 2A is a close up rear perspective view of the motor assembly 102 and the tension adjusting assembly 104 and FIG. 2B is a close up front perspective view of the motor assembly 102 and the tension adjusting assembly 104. Referring to FIGS. 2A and 2B, how the motor assembly 102 is coupled to the tension adjusting assembly 104 is illustrated. In particular, motor adjusting bracket 204 illustrated in FIG. 2A is coupled to a retaining plate 412 of the motor assembly 102 and an attaching member 208 that is received in the housing 105 of the tension adjusting assembly 104. The attaching member 208 is accessed via an opening 206 that extends through the housing 105 of the tension adjusting assembly 104 as illustrated in FIGS. 2A and 2B. The attaching member 208, in one embodiment, is coupled to attaching bracket 204 and retaining plate 412 by a shaft 252 that extends through an attaching opening 825 in the attaching member (illustrated in FIG. 8B) and apertures 270 in the attaching bracket 204 and aperture 272 in the retaining plate 412. Further in one embodiment, a screw 205 passing through the attaching bracket engages an aperture 811 (illustrated in FIG. 8B) to prevent a rotation of the attaching member 208 in the housing 105 when the adjusting member 108 is turned. In yet another embodiment, the size and shape of attaching member 208 is selected to fit snuggly within the housing 105 to prevent rotation. In this embodiment, screw 205 is not used. The attaching bracket 204 is further coupled to the retaining plate 412 through opening 206 in housing 105 via fastener 251 as illustrated in FIGS. 2A and 2B. The positioning of the attaching member 208 within the housing 105 is controlled by adjusting member 108. The tension adjusting assembly 104 is further discussed in regards to FIGS. 8A and 8B discussed below.

Figure 2C:
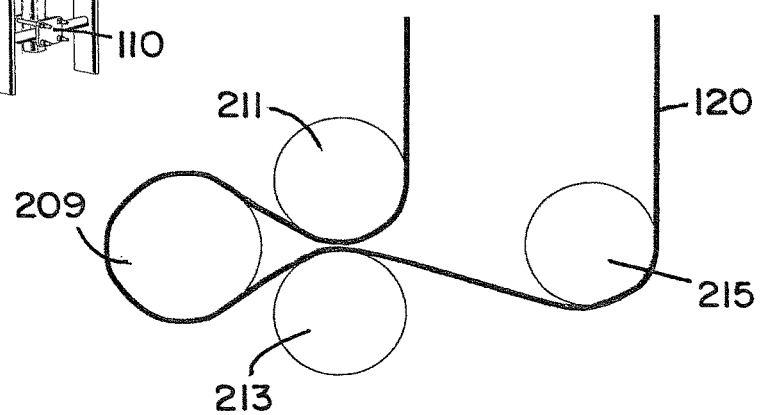
FIG. 2C illustrates the routing of a cable through sheaves of one embodiment of the present invention.

Further illustrated in FIG. 2A is climb assist bracket 202 that couples the climb assist attaching member 122 to the cable 120. In addition, FIG. 2A illustrates a proximity switch 250. The proximity switch 250 is used to monitor the movement of a sheave as further discussed below. Movement of the sheave in embodiments is used at least in part to control the motor assembly 102. This is also further discussed below in regards to FIG. 7. The motor assembly 102 includes four different sheave assemblies 209, 211, 213 and 215 around which the cable 120 is routed. In particular, sheave assemblies 215, 213 and 211 route the looped cable 120 around drive sheave assembly 209. Engagement of the looped cable 120 on the drive sheave assembly 209 provides movement of the looped cable 120. FIG. 2C illustrates the routing of the looped cable 120 through the sheave assemblies 209, 211, 213 and 215 of the motor assembly 102.

Figure 3:
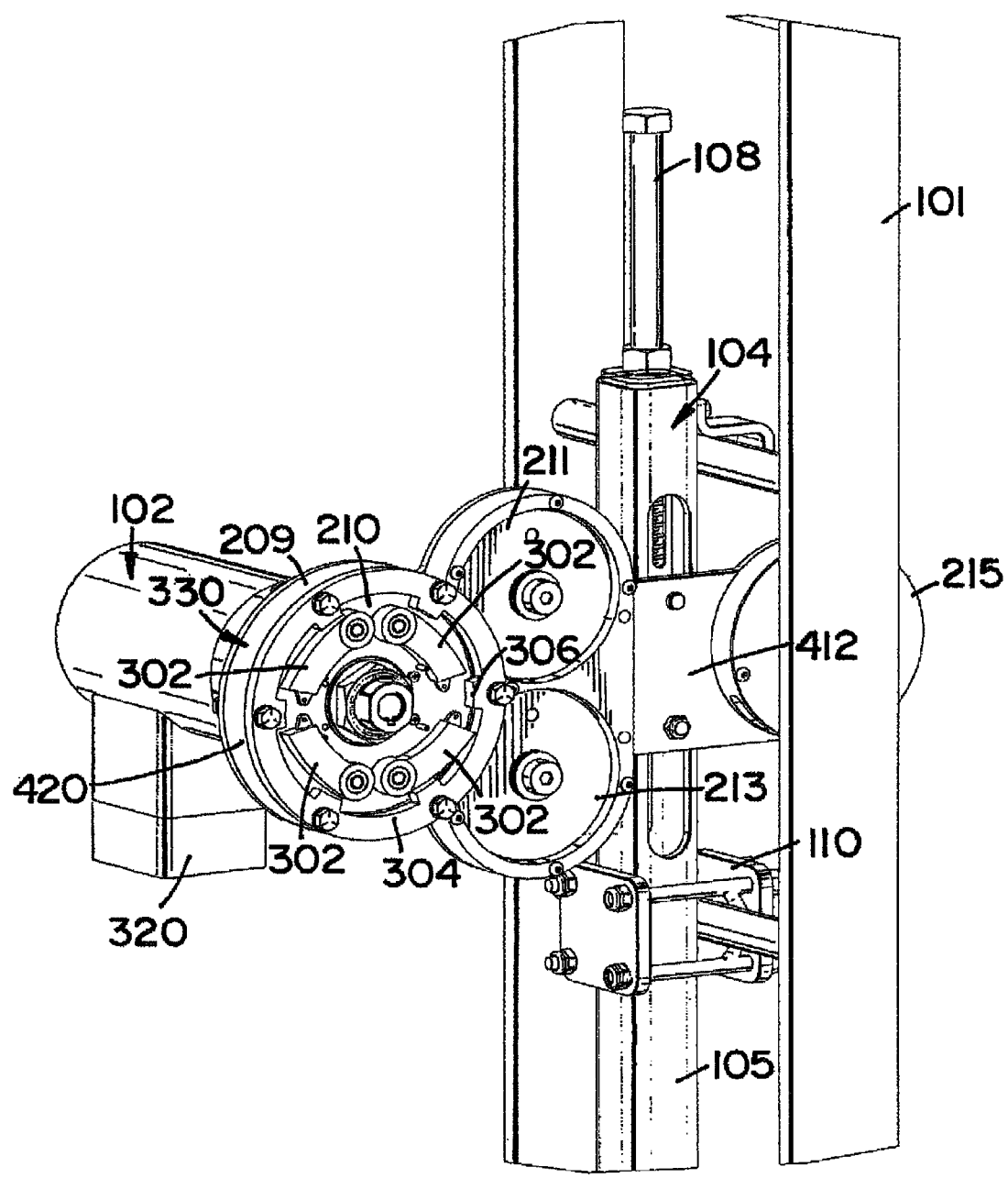
FIG. 3 is a close up front view of a motor assembly of one embodiment of the present invention.

Referring to FIG. 3, a close up front perspective view of the motor assembly 102 is illustrated. This view illustrates a fall arrest system 330 of one embodiment of the present invention. The fall arrest system 330 includes a ring catch 304 that is coupled to a guard cover 420 of the drive sheave assembly 209. The ring catch 304 includes inner protrusions 306. Pawls 302 are coupled to a drive sheave 210 of the drive sheave assembly 209. The pawls 302 rotate with the drive sheave 210. The pawls 302 are configured to engage the inner protrusions 306 of the ring catch 304 thereby stopping the rotation of the drive sheave 210 when the drive sheave 210 is rotated in a direction opposite than a climb assist direction at a select speed. Hence, if a user slips and falls, the looped cable 120 upon which the user is attached, will be pulled in the opposite direction (down) of the climb assist direction (up) in a fast manner. The looped cable 102, which is in frictional contact with the drive sheave 210, will move the drive sheave 210 in an opposite direction of the climb assist direction in response to the fall in a relatively fast manner. This relatively fast rotation will cause the pawls 302 to engage the inner protrusions 306 of the ring catch 304 thereby further preventing this directional movement of the drive sheave 210. Once the drive sheave 210 stops moving so will the cable 120 thereby arresting the fall. Since this fall arrest system (pawls 302 and ring catch 304) are mechanical, the fall arrest system works even if there is a power failure to the climb assist system 100. Further discussion of the fall arrest system is discussed below in regards to FIGS. 5C through 5E below. Also illustrated in FIG. 3 is a control panel 320 that is coupled to the motor assembly 102 in this example. In other embodiments the control panel 320 is located in different locations on the climb assist assembly 100. The control panel 320 provides a user interface to the climb assist assembly 100. An example of a control panel is described in relation to FIG. 6 described below.

FIGS. 4A and 4B illustrate the motor assembly 102. In particular, FIG. 4A illustrates a front perspective view of an assembled motor assembly 102 and FIG. 4B illustrated a front perspective view of an unassembled, exploded motor assembly 102. The motor assembly 102 includes a motor 402 that has a drive shaft 410. The motor 402 rotates the drive shaft 410. Generally the components as set out in FIG. 4B are coupled together by fasteners 450, 452, 454 and 460 and nuts 458 as illustrated. Attached to a housing of the motor 102 is a retaining plate 412 that includes an opening 411 for the drive shaft 410 to extend therethrough. A first routing sheave 212 of the first routing sheave assembly 211, a second routing sheave 214 of the second routing sheave assembly 213 and a third routing sheave 216 of the third routing sheave assembly 215 are rotationally coupled to the retaining plate 412. A first guard cover 414 fits around the first and second routing sheaves 212 and 214. First guard cover 414 includes a first opening 415 that provides a path for the looped cable 120 to the second routing sheave 214 and a second opening 413 that provides a path for the looped cable 120 to the first routing sheave 212. A first sheave cover 406 is coupled to the first guard cover 414 to cover a front of the first and second routing sheaves 212 and 214. A second guard cover 442 fits around the third routing sheave 216. The second guard cover 442 includes first and second openings 441 and 443 that provide a path for the looped cable 120 to and from the third routing sheave 216. A second sheave cover 408 is coupled to the second guard cover 442 to cover a front of the third routing sheave 216.

The drive sheave 210 is coupled to the drive shaft 410 of the motor 402 via slip clutch 502. A third guard cover 420 is coupled to the retaining plate 412 to cover the looped cable 120 in a V-shaped groove of the drive sheave 210. The third guard cover 420 includes a first cable notch 421 and a second cable notch 423 that provides a path for the looped cable 120 to and from the drive sheave 210. The ring catch 304 is coupled to the third guard cover 420 as illustrated. A first and second drive sheave covers 404 and 422 are coupled to the ring catch 304 to cover the front of the drive sheave 210.

Referring to FIG. 4C an assembled front perspective view of a motor assembly 430 of another embodiment is illustrated. In this embodiment includes a radio frequency identification (RFID) tag 432. The RFID tag 432 is used to identify the climb assist system 100 and track inspections and other information relating to the climb assist system 100. Also illustrated in this embodiment is plate 439 that is coupled to first sheave cover 406. An exploded front perspective view of motor assembly 430 is illustrated in FIG. 4D. This view illustrates how fasteners 434 engage washers 436 and bearings 438 to rotationally couple the respective first, second and third routing sheaves 212, 214 and 216 to the retaining plate 412.

The drive sheave 210 is further illustrated in FIGS. 5A and 5B. In FIG. 5A a front perspective assembled view of the drive sheave 210 including a slip clutch 502 is illustrated. In FIG. 5B, a front perspective exploded view of the drive sheave 210 and slip clutch 502 is illustrated. As illustrated, the drive sheave 210 includes a sheave 508. Sheave 508 has a groove 507 that receives the looped cable 120 (not shown). Groove 507 is V-shaped in one embodiment. Friction between the sheave 508 and the looped cable 120 cause the looped cable 120 to move. The tighter the tension on the looped cable 120 the more friction is created. The slip clutch 502 includes a stub shaft 521. The stub shaft 521 includes a central bore 501, a neck portion 526 and a cylindrical shaft portion 518 that extends from the neck portion 526. The central bore 501 receives the drive shaft 410 of the motor 402 (illustrated in FIG. 4B). The shaft portion 518 of the stub shaft 521 includes threads 524 and first and second flat surfaces 520 and 522 as illustrated. A first friction disk 504 has a first and second interior straight portion 503 and 505 that each abuts a respective first and second flat surface 522 and 520 of the shaft portion 518 of the stub shaft 521. As illustrated, a bushing 506 is received between the sheave 508 and stub shaft 521. The sheave 508 is retained on the shaft 518 of the stub shaft 521 with a nut 514 that engages threads 524 on the shaft 528 of the stub shaft 521. A second friction disk 510 and a washer 512 are positioned between the nut and the sheave 508. The second friction disk 510 that is positioned against the sheave 508 includes first and second straight portions 511 and 513 that abut the respective first and second flat surfaces 522 and 520 of the shaft portion 518 of the stub shaft 521. The slip clutch 502 allows sheave 508 to slip in relation to the drive shaft 410 if too much force is exerted. Hence, the slip clutch 502 prevents the motor assembly 102 from pulling the cable 102 with more force than is desired. For example, if an electric/electronic failure would occur that would cause the motor to provide too high of a torque output, the clutch 502 would prevent the user from being entirely lifted. In another example, the clutch 520 would slip if the user was to get their foot, clothing, tools etc. caught on something during the climb.

Referring to FIGS. 5C through 5E illustrations of the drive sheave 210 including the pawls 530 of the fall arrest system is illustrated. In particular, FIG. 5C is a front view of a drive sheave 210 of one embodiment. FIG. 5D is a cross-sectional side view of the drive sheave 210 of FIG. 5C along line BB and FIG. 5E is an exploded view front perspective view of the drive sheave 210 of FIG. 5C. As illustrated, the fall arrest system includes biasing members 530. The biasing members 530 in one embodiment are springs. A first end of each pawl 302 is pivotally coupled to a side plate 210a of the drive sheave 210 via fasteners 532 and bearings 532. Each biasing member 530 is coupled between a second end of a respective pawl 302 and side plate 210a of the drive sheave 210. The biasing members 530 bias the pawls 302 away from the inner protrusions 306 of the ring catch 304 (illustrated in FIG. 3) until enough centrifugal force is created by the speed of the drive sheave 210 to counter the force of the biasing members 530. This will occur during a fall event. As discussed above, the engagement of the pawls 302 with the inner protrusions 306 of the ring catch 304 provide the fall arrest function of the fall arrest system.

Figure 5F:
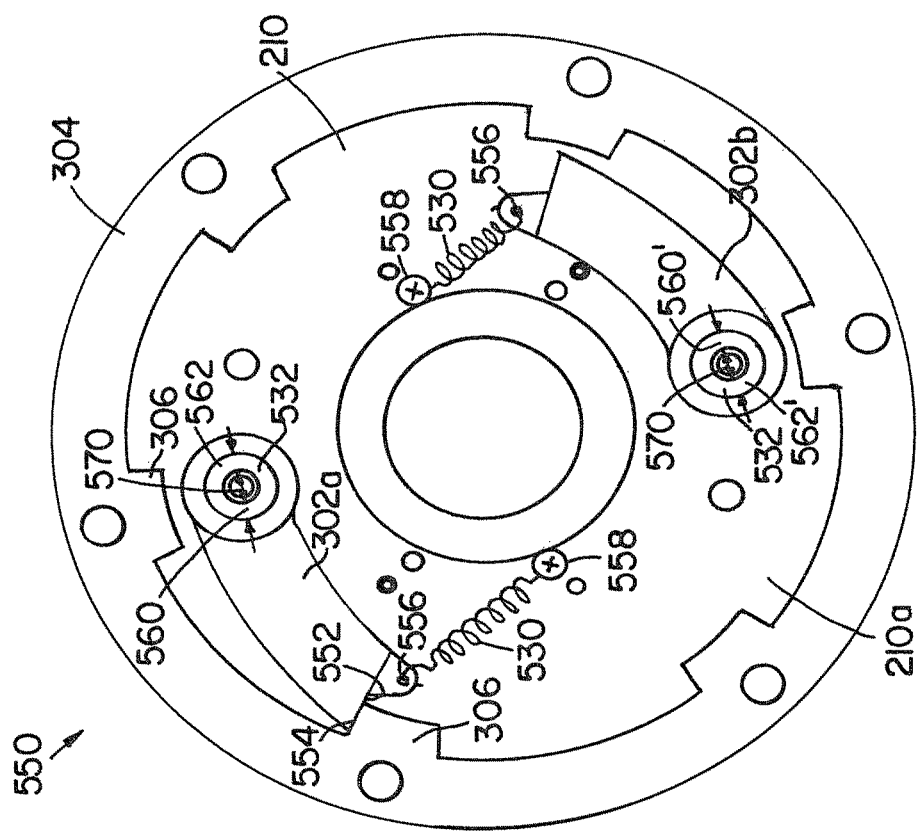
FIG. 5F is a front view of a fall arrest assembly of one embodiment of the present invention.

FIG. 5F illustrates another embodiment of a fall arrest assembly 550 including pawls 302A and 302B and ring catch 304. This fall arrest assembly 550 can be used in any type of fall arrest system implementing pivoting pawls to prevent the pay out of a lifeline during a fall event. In this embodiment, the bearings are bushings 532 made from a compressible material such as but not limited to elastic material such as urethane. This helps prevent "ratcheting" during a fall event. Ratcheting is a term used in the art to describe when the weight on a locked lifeline rebounds upward upon impact. The upward rebound can release the brake assembly (e.g. the pawl from an inner protrusion 306) thereby allowing the lifeline to be refracted and paid out causing the user to fall further until the brake assembly again stops the rotation of the drum. This ratcheting effect may occur several times during a fall. Having bushings 532 made from an elastic material assists in prevent ratcheting in fall arrest assembly 550.

Fall arrest system 550 in this example includes two pawls 302A and 302B. It will be understood that the one or more pawls could be used and that the present invention is not limited to two pawls. Each of the pawls 302A and 302B has a first end that is pivotally coupled to a side plate 210a of a rotational drum such as drive sheave 210. The drive sheave 210 is in a rotational connection with the lifeline such as the loop cable 120 as discussed above. Around the pivot connection 570 is the elastic bushing 532. Proximate another end of each of the pawls 302A and 302B, biasing members 530 are coupled between connecting apertures 556 in the respective pawls 302A and 302B and screws 558. As discussed above, the biasing members 530 bias the pawls 302 away from the inner protrusions 306 of the ring catch 304 until enough centrifugal force is created by the speed of the drive sheave 210 to counter the force of the biasing members 530, thus allowing the pawls to pivot outward.

FIG. 5F illustrates the fall arrest assembly 550 during a fall arrest event. In particular, FIG. 5F illustrates, pawl 302A pivoted such that surface 552 of pawl 302A engages surface 554 of an inner protrusion 306. This illustration further shows how the shape of the elastic bushing 532 deforms or compresses under a force provided by pawl 302A in response to a fall event. In particular, radial length 560, indicated by the respective arrows of a portion of bushing 532 associated with pawl 302A, is illustrated as being smaller than radial length 562, indicated by the respective arrows of another portion of the bushing 532 associated with pawl 302A. Moreover, radial lengths 560 and 562 can be compared to radial lengths 560' and 562' associated with pawl 302B which is not engaged with an inner protrusion 306. As illustrated, radial length 560 is less than radial length 560' and radial length 562 is more than radial length 562'.

In use, bushing 532 associated with pawl 302A deforms which absorbs some of the energy generated during the impact of the surface 552 of pawl 302A on surface 554 of the inner protrusion 306. The energy is absorbed instead of being released back (rebound) as is typical for a rigid contact system (for example metal on metal). In addition to this energy absorption aspect, the deformation of the bushing 532 allows a slight rotation of the sheave in the opposite direction of the fall before the pawl disengages. This is because it takes a few degrees of sheave rotation for the bushing to go back to its original non-deformed shape. The play (differing radial lengths) provided by the elastic bushing 532 during the few degrees of the sheave rotation is enough to help prevent disengagement between pawl 302A and the inner protrusion 306 of the ring catch 304 (ratchet wheel). Hence, even if the system rebounds a couple of degrees, the deformation provided by the elastic bushings 532 allows the system to catch up with the rebound without disengaging the pawl 302A from the inner protrusion 306. Accordingly, the use of elastic bushings 532 prevents ratcheting. Although only one pawl 302A is illustrated in FIG. 5F as engaging an inner protrusion, in other embodiments more than one pawl could engage inner protrusions during a fall event. Moreover, although the fall arrest assembly 550 is illustrated as being coupled to the drive sheave 210 of the climb assist system 100, it can be used in any type of fall arrest system utilizing a drum and one or more pawls such as but not limited to self-retracting lifelines.

Figure 6:
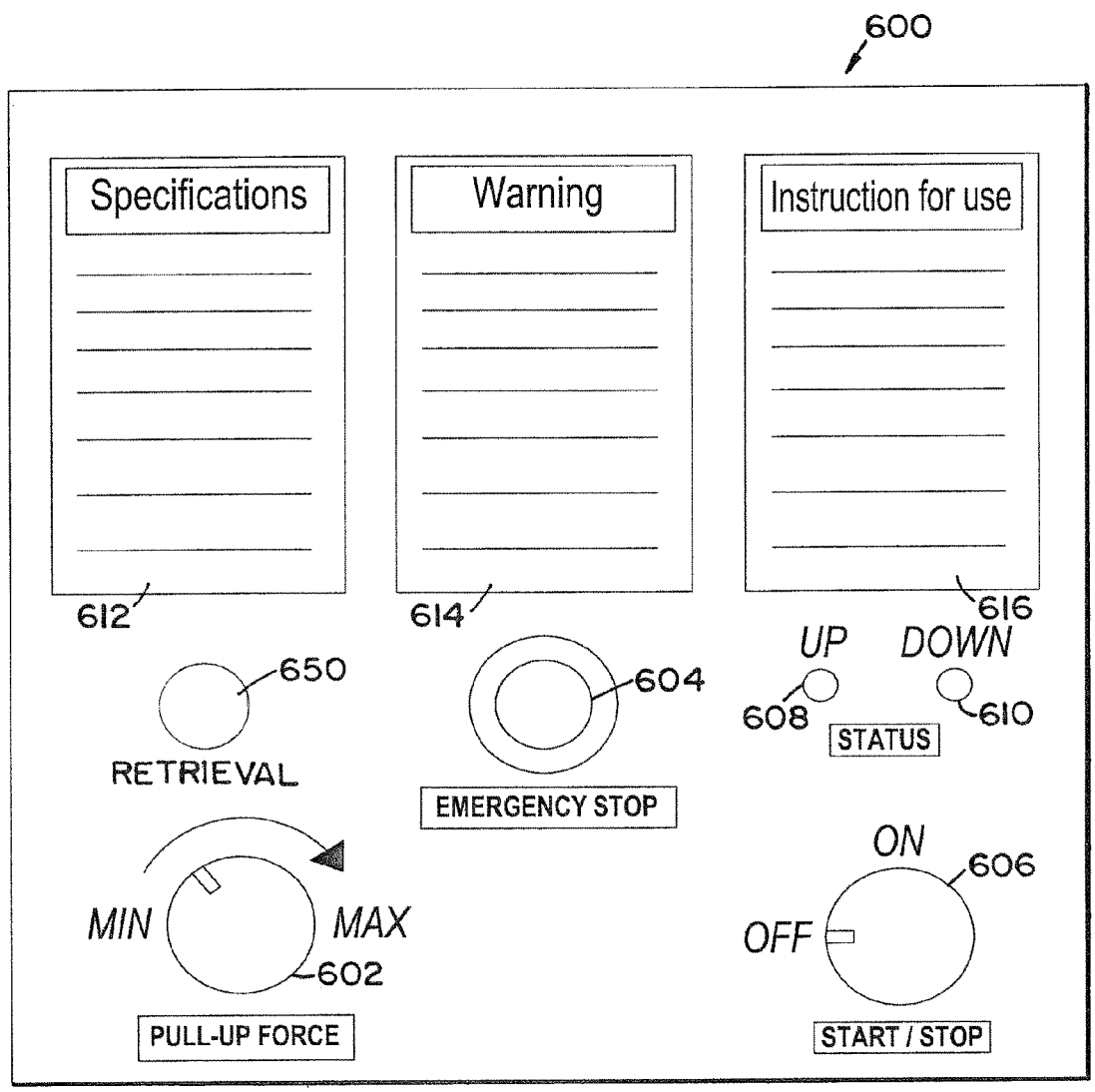
FIG. 6 is an illustration of a control panel of one embodiment of the present invention.

A control panel 600 of one embodiment is illustrated in FIG. 6. The control panel 600 provides a user interface for the climb assist system 100 similar to the control panel 320 of FIG. 3. As illustrated, one of the user controls is a pull-up force control 602 that regulates the amount of force applied to the drive shaft 410 by the motor 402. The amount of force selected depends on the weight of the user including the weight of any equipment or tools the user is carrying as well as the user's personal preference and comfort. For example, in one embodiment the lifting force can be adjusted between 50 to 120 lbs. However, other ranges of lifting force are contemplated depending on the application and the presenting invention is not limited to a specific range. Also illustrated is an on/off switch 606 that turns the motor 402 of the climb assist system 100 on when in use and off when not in use. Indicators 608 and 610 are used to provide a visual indication to a user of the status of the climb assist system such as whether it is going up or it is going down. An emergency stop control 604 allows a user proximate the control panel, to stop the motor 104 of the climb assist system 100 in a fast manner if an emergency is encountered. A retrieval control 650 allows a second user to retrieve the attaching member 122 when it is positioned proximate the top of the ladder 101 and the first user has disconnect their safety harness from the climb assist attaching member 122 of the cable 120. This allows more than one user to work proximate the top of the ladder 101. For example, a first user can use the climb assist system 100 to get to the top of the ladder 101. This first user will then disconnect their safety harness (not shown) from the attaching member 122 and connect it to D-ring 118 with a shock absorbing lanyard, or the like, or to another secure support. A second user on the ground will then push the retrieval control 650 to retrieve the attaching member 122. Once, the attaching member 122 is retrieved, the second user will attach the user's safety harness (not shown) to the attaching member 122 and activate the climb assist system 100. The control panel 600 in this embodiment also includes labels 612, 614 and 616. In particular, label 612 relates to specifications of the system 100, label 614 relates to warnings and label 616 relates to instructions for use.

Referring to FIG. 7, a block diagram of a control system 700 of the climb assist system 100 of an embodiment is illustrated. In this embodiment, a controller 702 is coupled to a control panel, such as control panel 600 of FIG. 6, to receive user inputs 704. The controller 702 is coupled to control the motor 402 based on the user inputs and a signal from the proximity switch 250. The proximity switch 250 illustrated further in FIG. 2A monitors the movement of a sheave of the motor assembly 102. The proximity switch 250 can generally be referred to as a movement sensor. As discussed above, in use the proximity switch 250 monitors the movement of its associated sheave. Any one of the sheaves, 212, 214, 216 or 210 illustrated in FIG. 4B could be monitored by the proximity switch 250. Hence, the present invention is not limited to monitoring a specific sheave 212, 214, 216 or 210 for movement. If the monitored sheave stops, the proximity switch 250 (or movement sensor), sends a signal to the controller 702 which stops the motor 402. To start the motor back up for climb assist, in one embodiment, the user simply tugs on the looped cable 120 which causes the monitored sheave 212, 214, 216 or 210 to move which in turn is detected by the movement sensor. The movement sensor sends a signal to the controller 702 which in response starts the motor 402 for climb assist. Hence, the movement sensor sends signals to the controller 702 based on actions of a user coupled to the looped cable 120. Further illustrated in FIG. 7 is an output 708 such as visual indicators 608 and 610 of FIG. 6 which are controlled by the controller 702 as illustrated in FIG. 7. In one embodiment, the controller 702 includes a variable frequency drive (VFD) which controls the torque and speed of the motor. The VFD ensures the motor 402 provides an appropriate amount of torque. In particular, the VFD causes the motor to rotate at an appropriate speed to achieve a desired torque. When the climber is moving, the VFD adjusts the speed of the motor 402 to catch up to the user until the appropriate torque is reached.

FIGS. 8A and 8B illustrate an embodiment of a tension adjusting assembly 104. As discussed above, friction between the cable 120 and the drive sheave 210 causes the cable 120 to move. Tension, controlled by the tension adjustment assembly 104, determines at least in part, the friction between the cable 120 and the drive sheave 210. FIG. 8A illustrates an assembled front perspective view of the tension adjusting assembly 104. FIG. 8B illustrates an exploded front perspective view of the tension adjusting assembly 104. As discussed above, the tension adjusting assembly 104 includes a housing 105 that is coupled to a ladder 101 at least in part with ladder hook 112. The housing 105 has an opening 206 that extends through opposing sides. As further discussed above, an attaching member 208 is received in the housing 105. The motor assembly 103 (not shown in FIGS. 8A and 8B) is coupled to attaching member 208 as discussed above in relation to FIGS. 2A and 2B. In particular, attaching openings 825 in the attaching member 208 illustrated in FIG. 8B are used to couple the attaching bracket 204 and retaining plate 412 of the motor assembly 102 as illustrated in FIGS. 2A and 2B to the attaching member 208 via shaft 252.

Referring back to 8B, the tension adjusting assembly 104 includes an adjustment member 108 and a moving support 803. When the adjusting member 108 is rotated, the moving support 803 is moved down to adjust the tension in the cable 120. The moving support 803 includes the attaching member 208 as discussed above. The moving support 803 further includes a biasing member 808, a washer 806, shaft 252 and bearings 812A and 812B. The shaft 252 fits through openings 825 in the attaching member 208. The bearings 812A and 812B fit on the shaft 252 proximate respective ends of the shaft 252. In particular, respective retaining rings 816A and 816B are positioned between the bearings 812A and 812B and an outer surface of the attaching member 208. The retaining rings 816A and 816B ensure the attaching tube 208 stays in a middle portion of the housing 105 which is square in one embodiment. The bearings 812A and 812B guide the attaching member 208 in the openings 206 in opposite sides of the housing 105 of the tension adjusting assembly 104. This is illustrated in regard to bearing 812B in opening 206 in FIG. 8A. Further, the adjusting member 108 threadably engages threaded aperture 804 in the housing 105 to move the adjusting member 108 up and down. Lock nut 802 is tightened when the desired amount of tension is achieved to retain the moving supporting 803 in a desired position within the housing 105. The adjustment member 108 has an engaging end 850 that engages washer 806 that in turn engages a first end of biasing member 808. A second end of biasing member 808 engages the shaft 252. The motor assembly 102 (shown in FIGS. 2A and 2B) coupled to the attaching member 208 forces the attaching member 208 toward the nut 802 (FIG. 8B) at the top of the tension adjusting assembly 104. The engaging end 850 of the adjusting member 108 abutting the washer 806 counters this force. The tension is increased by turning the adjusting member 108 in the threaded aperture 804 so the engaging end 850 of the adjusting member 108 moves away from the threaded aperture 804 and further compresses the biasing member 808 on the shaft 252. Hence, the rotation of the adjusting member 108 adjusts the tension of the cable 102 in the drive sheave 210. In embodiments, it is important to maintain enough tension so that an arrest of a fall is achieved and so the correct torque is transmitted to the user for climb assistance. In one embodiment a label 810 is used so a user can visually verify the correct amount of tension is being used. In one embodiment, the label 810 in relation to the position of washer 806 in a window 827 of the attaching member 208 indicates whether the tension is low, high or ok.

FIGS. 9A and 9B illustrate an upper cable guide 103 that is coupled to a top of a ladder. In particular, FIG. 9A illustrates an assembled front perspective view of an upper cable guide 103 and FIG. 9B illustrates an exploded front perspective view of the upper cable guide 103. The extension member 106 of the upper cable guide 103 includes a ladder hook 112, D-ring 118 and an upper sheave system 116 as discussed above. In one embodiment the extension member 106 is a square tube. As illustrated in FIG. 9B, the D-ring 118 is coupled to the extension member via bracket 922 and fasteners 930 and 932. The upper sheave system 116 includes an upper mounting plate 902, an upper guard cover 904 an upper sheave 906 and an upper cover 908. The upper mounting plate 902 is coupled to the extension member 106 via fasteners 930 and 932. The upper guard cover 904 fits around the upper sheave 906. The upper guard cover 904 includes openings 903 and 905 that allow for a path for the looped cable 120 (not shown in FIGS. 9A and 9B) to and from the upper sheave 906. The upper cover 908 covers a front of the sheave 906 and is coupled to the upper guard cover 904 and upper mounting plate 902 via fasteners 940 as illustrated.

FIGS. 10A, 10B and 10C illustrate another embodiment of an upper cable guide 1000 having a cable position adjustment plate 1014. FIG. 10A illustrates a front perspective view of the upper cable guide 1000, FIG. 10B illustrates a rear perspective view of the upper cable guide 1000 and FIG. 10C illustrated a front exploded perspective view of the upper cable guide 1000. This upper cable guide 1000 includes an extension member 1002 that is attached proximate a second end of a ladder similar to extension member 106 of FIGS. 1A and 1B. A ladder hook 1006 is coupled to the extension member 1002 via fasteners 1020. A D-ring 1008 is coupled to the extension member 1002 via bracket 1018. Bracket 1018 is coupled in part to the extension member 1002 via bolt 1022, washer 1050 and nut 1048.

An upper sheave assembly 1004 is coupled to the adjustment plate 1014. The upper sheave assembly 1004 includes an upper sheave 1010 that is rotationally coupled to the adjustment plate 1014 via fastener 1040, washers 1042 and nut 1046. A bearing 1044 is positioned between a surface of fastener 1040 and a portion of the upper sheave 1010 that defines a central aperture 1060 passing through the upper sheave 1010. An upper guard cover 1012 covers a portion of cable 120 (not shown) received in the upper sheave 1010. The upper guard cover 1012 has a first opening 1062 and second opening 1064 that allow the cable 120 (not shown) to enter into and exit out of the upper sheave 1010. A front upper cover 1016 is used to cover the front of the sheave 1010. The front upper cover 1016 and the upper guard cover 1012 are coupled to the adjustment plate 1014 via fasteners 1038. The adjustment plate 1014 includes upper and lower slots 1030A and 1030B. The adjustment plate 1014 is slidably coupled to the extension member 1002 via bolts 1024A and 1024B that pass through the upper and lower slots 1030A and 1030B and through apertures 1032A and 1032B in the extension member 1002. Nuts 1036A and 1036B retain the bolts 1024A and 1024B in the upper and lower slots 1030A and 1030B of the adjustment plate 1014 and the apertures 1032A and 1032B of the extension member 1002. As also illustrated in FIG. 10C, washers 1026A and 1026B and spacers 1028A and 1028B are used with bolts 1024A and 1024B. To adjust the position of the upper sheave assembly 1004, bolts 1024A and 1024B are loosened and the assembly 1004 is slid in slots 1030A and 1030B to a desired position. The bolts 1024A and 1024B are then tightened to maintain the assembly 1004 in the desired position. Hence, this embodiment allows for the positioning of the looped cable 102 in relation to a ladder 101. One position of the looped cable 120 in relation to the ladder 101 is illustrated in FIG. 1B.

Referring to FIGS. 11A through 11D yet another embodiment of an upper cable guide is illustrated. FIG. 11A illustrates a back perspective view of the upper cable guide 1100, FIG. 11B illustrates a front perspective view of the upper cable guide 1100 and FIG. 11C illustrated a front exploded perspective view of the upper cable guide 1100. This upper cable guide 1100 includes an extension member 1102 that is attached proximate a second end of a ladder similar to extension member 106 of FIGS. 1A and 1B. A ladder hook 1106 is coupled to the extension member 1106. A D-ring 1108 is coupled to the extension member 1102 via bracket 1118. Bracket 1118 is coupled in part to the extension member 1102 via fasteners 1124A and 1124B and nuts 1136A and 1136B respectively.

An upper sheave assembly 1104 is coupled to an adjustment plate 1114. The upper sheave assembly 1104 includes an upper sheave 1110 that is rotationally coupled to a retaining plate 1170 via fastener 1140, washers 1142 and nut 1148. In particular, fastener 1140 passes through a retaining plate central opening 1170c in the retaining plates and is engaged with nut 1148. A bearing 1144 is positioned between a surface of fastener 1140 and a portion of the upper sheave 1110 that defines a central aperture 1160 passing through the upper sheave 1110. An upper guard cover 1112 covers a portion of cable 120 (not shown) received in the upper sheave 1110. The upper guard cover 1112 has a first opening 1162 and second opening 1164 that allow the cable 120 (not shown) to enter into and exit out of the upper sheave 1110. A front upper cover 1116 is used to cover the front of the sheave 1110. The front upper cover 1116 and the upper guard cover 1112 are coupled to the retaining plate 1070 via fasteners 1138.

The upper cable guide 1100 of this embodiment further includes an adjustment plate 1114. The adjustment plate 1114 includes a first slot 1114C and a second slot 1114D. A connecting third slot 1114E is positioned between the first and second slots 1114C and 1114D. The third slot 1114E has a height that is greater than the height of the first and second slots 1114C and 1114D. The retaining plate 1170 is slidably coupled to the adjustment plate 1114. In particular, fasteners 1172A and 1172B passing through apertures 1170A and 1170B in the retaining plate 1170 and in slots 1114C and 1114D respectfully are retained via washers 1150 and nuts 1146. Nut 1148 coupled to fasteners 1140 is received in the central slot 1114E. To adjust the location of the sheave 1110, nuts 1146 are loosened to allow fasteners 1172A and 1172B to slide in slots 1114C and 1114D of the adjustment plate. When the desired location is achieved, the nuts 1146 are re-tightened. The adjustment plate 1114 is coupled to extension member 1102 via fasters 1124A and 1124B. In particular, fasteners 1124A and 1124B passing through, apertures 1114A and 1114B in the adjustment plate 1114, passages 1132A and 1132B in the extension member 1102 are coupled to the extension member 1102 via nuts 1136A and 1136B. Spacers 1128A and 1128B are used to space the adjustment plate 1114 from the extension member 1102. In one embodiment, the adjustment plate 1114 is not symmetrical and therefore its assembly in the right position is critical. In this embodiment, a notch 1182 is placed in a surface that defines slot 1114E as indicated in the close up view of section 1180 in FIG. 11D. The notch 1182 in this embodiment indicates the adjustment plate 1114 should be positioned with the notch 1182 towards the ground when assembling the upper cable guide 1100.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. A climb aid and safety system, comprising:
a motorized climb assist system configured to assist a user in using a ladder, the motorized climb assist system including a looped belt with an attaching member that is configured and arranged to be coupled to a safety harness of the user, the looped belt providing a pulling force to assist the user in using the ladder;
the motorized climb assist system including a motor assembly including,
an electric motor having a drive shaft, the motor generating a lift force,
a drive sheave coupled to the drive shaft to convey the lift force of the motor to the drive sheave, the drive sheave being in frictional contact with the looped belt; and
a fall arrest system integrated with the drive sheave of the motorized climb assist system, the fall arrest system configured and arranged to prevent the looped belt from moving during a fall event, the fall arrest system including,
a ring catch coupled to the motor assembly, the ring catch including at least one protrusion; and at least one pawl pivotally coupled to the drive sheave, the at least one pawl configured and arranged to engage the at least one protrusion of the ring catch to prevent the drive shaft from rotating thereby preventing the looped belt from moving during a fall event;

an upper guide configured to be coupled proximate a second end of the ladder, the motor assembly and the upper guide configured to movably engage the looped belt therebetween, the upper guide including;

an extension member having a first end configured to be coupled proximate the second end of the ladder;

an upper mounting plate coupled proximate a second end of the extension member; and an upper sheave rotationally coupled to the upper mounting plate, the upper sheave configured to engage the looped belt.

2. The system of claim 1, wherein the motorized climb assist system further comprises:

a tension adjusting assembly configured to be coupled proximate a first end of the ladder; and the motor assembly coupled to the tension adjusting assembly.

3. The system of claim 2, wherein the tension adjusting assembly further comprises:

a housing including opposing sides with an opening extending through the opposing sides, an attaching member received in the housing, the motor assembly coupled to the attaching member through the opening;

a biasing member having a first end configured to engage the attaching member; and an adjusting member configured to engage a second end of the biasing member to adjust a tension in the looped belt.

4. The system of claim 3, wherein the motor assembly further comprises:

a retaining plate coupled to the motor; and at least one routing sheave rotationally coupled to the retaining plate, the at least one routing sheave configured to route the looped belt around the drive sheave and to the upper guide.

5. The system of claim 4, further comprising;

a movement sensor configured to detect motion of the at least one routing sheave.

6. The system of claim 5, further comprising:

a controller configured to control the motor, the controller further configured to control the motor based at least in part on a signal from the movement sensor.

7. The system of claim 4, wherein the drive sheave includes a slip clutch that engages the drive shaft of the motor.

8. The system of claim 1, wherein the fall arrest system of the motor assembly further comprises:

an elastic bushing for each pawl, each elastic bushing positioned about a pivot connect that pivotally connects an associated pawl to the drive sheave.

9. The system of claim 1 , wherein the upper mounting plate is an upper adjusting plate that is slidably attached to the extension member to adjust a position of the upper sheave.

10. The system of claim 1, further comprising:

a controller coupled to control the motor assembly; and a movement sensor configured to sense the movement of the looped belt, the movement sensor in communication with the controller, wherein the controller controls the motor assembly based at least in part on signals from the movement sensor.

11. The system of claim 10, further comprising:

user inputs configured to provide control signals to the controller; and at least one output configured to indicate a current state of the motor assembly.

12. The system of claim 11, wherein the user inputs are at least one selected from a group of inputs consisting of a pull-up force adjustment, a start/stop, an emergency stop and a retrieval.

13. The system of claim 1, wherein the looped belt is one selected from a group consisting of an elongated member, looped cable and a looped rope.

14. A motorized climb assist system comprising:

a looped belt;

an attaching member coupled to the looped belt configured to attach a safety harness thereto;

a motor assembly including, a motor having a drive shaft, the motor generating a lift force, and a drive sheave in frictional contact with the looped belt;

a slip clutch selectively coupling a rotation of the drive sheave to a rotation of the drive shaft; and a fall arrest system integrated with the drive sheave, the fall arrest system configured to limit the looped belt movement as the result of a fall event, the fall arrest system including, a catch coupled to the motor assembly, the catch including at least one protrusion; and at least one pawl pivotally coupled to the drive sheave, the at least one pawl configured and arranged to engage the at least one protrusion of the catch to prevent the drive shaft from rotating thereby preventing the looped belt from moving during a fall event;

an upper guide configured to be coupled proximate a second end of a ladder, the motor assembly and the upper guide configured to movably engage the looped belt therebetween, the upper guide including;

an extension member having a first end configured to be coupled proximate the second end of the ladder;

an upper mounting plate coupled proximate a second end of the extension member; and an upper sheave rotationally coupled to the upper mounting plate, the upper sheave configured to engage the looped belt.

15. The motorized climb assist system of claim 14, wherein the looped belt is one selected from a group consisting of an elongated member, a looped cable and a looped rope.

16. The motorized climb assist system of claim 14, wherein the drive sheave is configured to move the looped belt when in use for climb assist and to limit movement of the looped belt in response to a fall event via the fall arrest system.

17. The motorized climb assist system of claim 14, further comprising:

a retaining plate coupled to the motor;

the catch coupled to the retaining plate; and at least one routing sheave rotationally coupled to the retaining plate, the at least one routing sheave configured to route the looped belt to the drive sheave.

18. The motorized climb assist system of claim 17, further comprising:

a tension adjusting assembly coupled proximate a first end of a ladder, the tension adjusting assembly further coupled to the motor assembly, the tension adjusting assembly configured to adjust a tension in the looped belt around the drive sheave.

19. The motorized climb assist system of claim 18, wherein the tension adjusting assembly further comprises:

a housing including an opening extending therethrough;

an attaching member received in the housing, the retaining plate of the motor assembly coupled to the attaching member through the opening;

a biasing member having a first end configured to engage the attaching member; and an adjusting member configured to engage a second end of the biasing member to adjust a tension in a cable engaged with the climb assist system.

20. The motorized climb assist system of claim 14, further comprising:

a motion sensor configured to detect motion of the looped belt; and a controller coupled to control the motor, the controller further coupled to receive signals from the motion sensor and control the motor based at least in part by received signals from the motion sensor.

21. A climb assist system, comprising:

a tension adjusting assembly coupled proximate a first end of a ladder;

a motor having a drive shaft, the motor generating a lift force;

a drive sheave;

a slip clutch selectively coupling a rotation of the drive sheave to a rotation of the drive shaft;

a retaining plate coupled to the motor and the tension adjusting assembly;

a first routing sheave rotationally coupled to the retaining plate;

a second routing sheave rotationally coupled to the retaining plate;

a third routing sheave rotationally coupled to the retaining plate, wherein the third routing sheave is positioned on a different side of the ladder than the drive sheave, the first sheave and the second sheave;

an upper guide having a first end and a second end, the first end of the upper guide coupled proximate a second end of the ladder;

an upper sheave coupled proximate the second end of the upper guide;

a looped cable frictionally engaged with the drive sheave, the upper sheave, and the first, second and third routing sheaves, wherein the first, second and third sheaves are configured to route the looped cable between the drive sheave and the upper sheave;

an attaching member configured to attach a safety harness to the looped belt; and a fall arrest system integrated with the drive sheave of the drive shaft to prevent the looped cable from moving during a fall event, the fall arrest system including, at least one pawl pivotally coupled to the drive sheave, a catch coupled to the retaining plate, the at least one pawl configured and arranged to engage the catch during a fall event.

22. The climb assist system of claim 21, the fall arrest system is configured to prevent movement of the looped cable in the event of a fall; and the catch being a ring catch having internal protrusions.

23. The climb assist system of claim 21, further comprising:

a cable position adjustment plate slidably coupled to the upper guide, the upper sheave rotationally coupled to the cable position adjustment plate, wherein the cable position adjustment plate is configured to adjust the position of the upper sheave.

24. The climb assist of claim 21, wherein the tension adjusting assembly further comprises:

a housing including an opening extending therethrough, an attaching member received in the housing, the motor assembly coupled to the attaching member through the opening;

a biasing member having a first end configured to engage the attaching member; and an adjusting member configured to engage a second end of the biasing member to adjust a tension in a cable engaged with the climb assist system.

25. The climb assist system of claim 21, further comprising:

the tension adjusting assembly having a first ladder hook configured to engage the ladder while the tension adjusting assembly is being coupled to the ladder; and the upper guide having a second ladder hook configured to engage the ladder while the upper guide is being coupled to the ladder.

\* \* \* \* \*